US011244219B2

United States Patent
Chen et al.

(10) Patent No.: US 11,244,219 B2
(45) Date of Patent: Feb. 8, 2022

(54) ELECTRONIC TAG AND CONTROL METHOD THEREOF

(71) Applicants: Chongqing BOE Smart Electronics System Co., Ltd., Chongqing (CN); BOE TECHNOLOGY GROUP CO., LTD., Beijing (CN)

(72) Inventors: Lichun Chen, Beijing (CN); Yunyan Xie, Beijing (CN); Bo Liu, Beijing (CN); Qiangeng Cheng, Beijing (CN)

(73) Assignees: CHONGQING BOE SMART ELECTRONICS SYSTEM CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/941,680

(22) Filed: Jul. 29, 2020

(65) Prior Publication Data
US 2021/0089852 A1  Mar. 25, 2021

(30) Foreign Application Priority Data
Sep. 19, 2019 (CN) .......................... 201910887640.1

(51) Int. Cl.
*G06K 19/07* (2006.01)

(52) U.S. Cl.
CPC ..... *G06K 19/0715* (2013.01); *G06K 19/0723* (2013.01)

(58) Field of Classification Search
CPC ................. G06K 19/0715; G06K 19/0723
USPC ........................................... 235/492
See application file for complete search history.

(56) References Cited

U.S. PATENT DOCUMENTS

| 9,984,321 | B2* | 5/2018 | Rampetzreiter ... | G06K 19/0723 |
| 2003/0058543 | A1* | 3/2003 | Sheedy .............. | G02B 27/0172 |
|  |  |  |  | 359/630 |
| 2013/0009907 | A1* | 1/2013 | Rosenberg .......... | G06F 3/04186 |
|  |  |  |  | 345/174 |
| 2016/0358577 | A1* | 12/2016 | Liao ........................ | H02M 3/07 |

* cited by examiner

*Primary Examiner* — Michael G Lee
*Assistant Examiner* — David Tardif
(74) *Attorney, Agent, or Firm* — Westman, Champlin & Koehler, P.A.

(57) ABSTRACT

The present disclosure discloses an electronic tag and a control method thereof. The electronic tag comprises: a power supply module configured to supply power to the electronic tag; a display module configured to display a display screen required by the electronic tag; an electronic tag circuit configured to control the electronic tag to operate in a state that the electronic tag is powered by the power supply module; and a switch circuit configured to disconnect the power supply module from the electronic tag circuit when the display screen does not need to be updated.

13 Claims, 2 Drawing Sheets

ELECTRONIC TAG AND CONTROL METHOD THEREOF

CROSS-REFERENCE TO RELATED APPLICATION(S)

This application claims priority to Chinese Application No. 201910887640.1, entitled "ELECTRONIC TAG AND CONTROL METHOD THEREOF" and filed on Sep. 19, 2019, which is incorporated herein by reference in its entirety.

TECHNICAL FIELD

The present disclosure relates to the field of display technology, and more specifically, to an electronic tag and a control method thereof.

BACKGROUND ART

With the rapid development of Internet of Things technology, electronic tags have gradually entered the view of people. Large shopping malls and small convenience stores are gradually replacing traditional paper price tags with electronic tags, thereby updating product information in real time, and reducing the number of staff in shopping malls and supermarkets. The electronic tag may not only provide consumers with more comprehensive and accurate product information, but also greatly reduce the number of staff in large shopping malls and supermarkets, change information more timely and quickly, and make a change operation more convenient and concise.

Most existing electronic tags use electronic papers. Due to a reflective display characteristic of the electronic paper, the electronic tag has become a low-power product. The electronic tag is powered by a battery when a price of a product is changed and updated, and after the update is completed, the battery stops supplying power to the electronic tag. The electronic paper uses a principle of reflection to display an updated screen.

Existing electronic tag is usually powered by a button battery, and energy of the button battery is limited, thus a service life of the electronic tag is limited. According to an energy consumption analysis of the existing electronic tag, the existing electronic tag generally uses 2 button batteries. The power of the 2 button batteries is almost exhausted after the electronic tag is used for about 5 years.

SUMMARY

In a first aspect of an embodiment of the present disclosure, an electronic tag is provided, comprising:
a power supply module configured to supply power to the electronic tag;
a display module comprising a reflective display unit and configured to display a display screen required by the electronic tag
an electronic tag circuit configured to control the electronic tag to operate in a state that the electronic tag is powered by the power supply module; and
a switch circuit configured to disconnect the power supply module from the electronic tag circuit in response to not receiving an update instruction.

Optionally, the switch circuit is configured to connect the power supply module to the electronic tag circuit in response to receiving the update instruction.

Optionally, the switch circuit comprises a tunneling magnetoresistance (TMR) sensor, which is configured to be turned on or off in response to a change in an external magnetic field.

Optionally, the change in the external magnetic field is generated by a movement of a magnet installed in an external device relative to the electronic tag, and the external device moves the magnet therein in response to receiving the update instruction.

Optionally, the electronic tag circuit is configured to:
perform a detecting action in response to receiving the update instruction; and
receive updating data after performing the detection action for a predetermined time interval, and update the display screen according to the updating data.

Optionally, the switch circuit is further configured to disconnect the power supply module from the electronic tag circuit after the updating of the display screen is completed.

Optionally, after the updating of the display screen is completed, the electronic tag sends an update completion instruction to the external device, and the external device moves the magnet therein in response to receiving the update completion instruction, thereby disconnecting the power supply module from the electronic tag circuit.

Optionally, the switch circuit further comprises a resistance connected in parallel with the TMR sensor.

Optionally, wherein the switch circuit further comprises a first capacitor and a second capacitor, and the first capacitor and the second capacitor are connected in parallel between a power supply voltage terminal of the power supply module and a ground terminal.

Optionally, the power supply module comprises a button battery.

Optionally, the display module comprises an electronic paper.

In a second aspect of an embodiment of the present disclosure, a control method of an electronic tag is provided, comprising:
supplying, by a power supply, power to the electronic tag;
controlling the electronic tag to operate in a state that the electronic tag is powered by the power supply;
displaying a display screen required by the electronic tag; and
in response to not receiving an update instruction, disconnecting the power supply of the electronic tag.

Optionally, the control method of the electronic tag further comprises:
connecting the power supply of the electronic tag in response to receiving the update instruction.

Optionally, the control method of the electronic tag further comprises:
performing a detecting action in response to receiving the update instruction; and
receiving updating data after performing the detection action for a predetermined time interval, and updating the display screen according to the updating data.

Optionally, the control method of the electronic tag further comprises:
disconnecting the power supply of the electronic tag after the updating of the display screen is completed.

Optionally, the electronic tag comprises a tunneling magnetoresistance (TMR) sensor connected between the power supply and an electronic tag circuit of the electronic tag, and wherein the disconnecting the power supply of the electronic tag comprises:

changing an external magnetic field so that the TMR sensor is turned off in response to a change in the external magnetic field.

Optionally, the control method of the electronic tag further comprises: sending, by the electronic tag, an update completion instruction to the external device, the external device moving the magnet therein in response to receiving the update completion instruction, thereby disconnecting the power supply of the electronic tag.

BRIEF DESCRIPTION OF DRAWINGS

In order to more clearly explain technical solutions of embodiments of the present disclosure, accompanying drawings of the embodiments will be briefly introduced below. Obviously, the accompanying drawings in the following description only relate to some embodiments of the present disclosure, and are not intended to limit the present disclosure.

DETAILED DESCRIPTION

Figure 1:
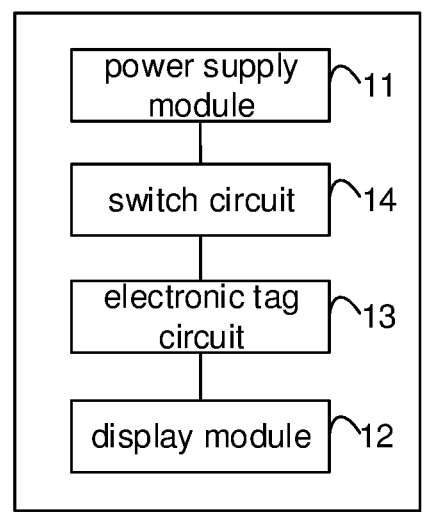
FIG. 1 is a schematic block diagram of an embodiment of an electronic tag according to an embodiment of the present disclosure.

To make objects, technical solutions, and advantages of the embodiments of the present disclosure more clear, the technical solutions of the embodiments of the present disclosure will be described clearly and completely in conjunction with the accompanying drawings of the embodiments of the present disclosure. Obviously, the described embodiments are a part of the embodiments of the present disclosure, but not all the embodiments. Based on the described embodiments of the present disclosure, all other embodiments obtained by those skilled in the art without creative effort fall within the scope of the present disclosure.

Unless otherwise defined, technical or scientific terms used in the present disclosure shall have the general meanings understood by those skilled in the art to which this disclosure belongs. As used in this disclosure, terms such as "first", "second", etc. do not indicate any order, quantity or importance, but are only used to distinguish different components. Similarly, terms such as "a", "an" or "the", etc., do not mean a limit in quantity, but mean that there is at least one related element. Terms such as "include" or "contain", etc., mean that an element or object appearing before the terms covers elements or objects and their equivalents listed after the terms, but do not exclude other elements or objects. Terms such as "connected to" or "connected with", etc. are not limited to physical or mechanical connections, but may include electrical connections, whether direct or indirect. Terms such as "up", "down", "left", "right", etc., are only used to indicate a relative positional relationship. When an absolute position of a described object changes, the relative positional relationship may also change accordingly.

Power consumption of an existing electronic tag is mainly composed of standby power consumption, detection power consumption, data transmission power consumption and updating power consumption. The data transmission power consumption and updating power consumption occur only when there is an update operation demand. The standby power consumption always exists in a circuit of the existing electronic tag, and a standby current of the existing electronic tag is 1.5~4 µA. In a standby state, a detection action is performed every 15 s, which will result in the detection power consumption. A detection current for each detection action is 2~8 mA, and 5760 times of detection action are performed every day. It can be seen that when the electronic tag is in the standby state, both the standby power consumption and the detection power consumption consume a large amount of power consumption of power supply, which are important factors that affect the service life of the power supply.

The energy consumption of the existing electronic tag is mainly determined by an update current (that is, a current required to update the display screen) and update time period, a data transmission current and data transmission time period, a detection current and detection time period, and a standby current and standby time period. Since the power of each button battery CR2450 in the electronic tag is about 620 mAh, the power of two button batteries is about 1240 mAh, and the service life of the electronic tag is more than 5 years. A calculation formula of the power consumption of the electronic tag is as follows:

Power consumption of the electronic tag=Standby current*Standby time period+Update current*Update time period*Number of updates/day+Detection current*Detection time period*Number of detections/day+Data transmission current*Data transmission time period*Number of data transmissions/day.

For the existing electronic tag, the power consumption per day is as follows: in a case that the standby current of the electronic tag is 2~4 µA and one day includes 24 hours, the standby power consumption of the electronic tag per day is 0.048~0.096 mAh; in a case that the update current of the electronic tag is 6~20 mA, each update time period is 15~30 s, and the number of updates per day is 2~4 times, the updating power consumption of the electronic tag per day is 0.125~1.67 mAh; in a case that the data transmission current of the electronic tag is 2~8 mA, each data transmission time period is 2~20 s, and the number of data transmissions per day is 2~4 times, the data transmission power consumption of the electronic tag per day is 0.0056~0.44 mAh; in a case that the detection current of the electronic tag is generally 4~10 mA, each detection time period is 6~50 ms, and the detection is performed every 15 s, and the number of detections per day is 5760 times, the detection power consumption of the electronic tag per day is approximately 0.096~2 mAh. Information on the power consumption is shown in the following table:

TABLE 1

Power consumption table of the existing electronic tag

| Project | Current | Time/ everytime | Number/ day | Power consumption/ day |
|---|---|---|---|---|
| Updating screen | 6~20 mA | 15~30 s | 2~4 | 0.125~1.67 mAh |
| Transmitting data | 2~8 mAh | 2~20 s | 2~4 | 0.0056~0.44 mAh |
| Detection | 4~10 mA | 6~50 ms | 5760 | 0.096~2 mAh |
| Standby | 2~4 µA | — | — | 0.048~0.096 mAh |

Accordingly, the embodiments of the present disclosure provide an electronic tag that can extend the service life of the power supply to a certain extent. FIG. 1 illustrates a schematic block diagram of an embodiment of an electronic tag according to an embodiment of the present disclosure.

As shown in FIG. 1, the electronic tag 10 may include a power supply module 11, a display module 12, an electronic tag circuit 13 and a switch circuit 14.

The power supply module 11 is configured to supply power to the electronic tag. Optionally, the power supply module 11 includes a power supply for outputting a supply voltage, and the power supply may be various power supplies that may be applied to the electronic tag, for example, small-sized elements that may supply power, such as button batteries.

The display module 12 includes a reflective display unit, and is configured to display a desired display screen required by the electronic tag by using the principle of reflection. Optionally, the reflective display unit is a reflective display panel that displays the desired display screen by using the principle of reflection. The reflective display panel may be various reflective display panels that may be applied to the electronic tag, such as an electronic ink panel or electronic paper.

The electronic tag circuit 13 is configured to, in a state that it is powered by, for example, the power supply module 11, control the electronic tag to operate. Optionally, the electronic tag circuit 13 is a circuit composed of elements required for controlling the electronic tag to operate. There may be a plurality of operating states for the electronic tag, such as updating state, data transmission state, detection state, standby state, etc. The electronic tag circuit may include a circuit composed of various elements required to enable the electronic tag to operate in the aforementioned states.

The switch circuit 14 is configured to disconnect the power supply module 11 from the electronic tag circuit 13 when the display screen does no need to be updated. It should be noted that the switch circuit 14 may be any device or element capable of turning off or turning on the circuit when needed, and its specific structure is not limited herein. Specifically, whether the display screen needs to be updated is determined by a user. When the user determines that the display screen needs to be updated, for example, when the price changes or the corresponding commodity changes, a control system is controlled to send an update instruction to the electronic tag. The switch circuit 14 connects the power supply module 11 to the electronic tag circuit 13 in response to receiving the update instruction. In response to not receiving the update instruction, the switch circuit 14 disconnects the power supply module 11 from the electronic tag circuit 13.

A controller may be provided in the electronic tag, and the controller is configured to control the switch circuit 14 to connect the power supply module 11 to the electronic tag circuit 13 in response to receiving the update instruction, and to control the switch circuit 14 to disconnect the power supply module 11 from the electronic tag circuit 13 in response to not receiving the update instruction.

In an optional embodiment, the display module 12 includes the electronic paper. The characteristic of the electronic paper is that a display state of the electronic paper is maintained as it is in the case of power-off. When the display screen does not need to be updated, the power supply module 11 and the electronic tag circuit 13 are disconnected by the switch circuit 14, so that the electronic tag itself achieves zero power consumption and zero loss during a normal display process of the display module 12 (at this time, the display screen does not need to be updated).

As can be seen from the above embodiment, the electronic tag according to the embodiment of the present disclosure is provided with the switch circuit so that the power supply module and the electronic tag circuit are disconnected by the switch circuit when the display screen does not need to be updated, so that the standby power consumption and the detection power consumption do not occur when the display screen does not need to be updated, thereby reducing power consumption of the power supply and extending the service life of the power supply, that is, the electronic tag can achieve low power consumption.

When used in storage places such as warehouses, the electronic tag usually rarely needs to perform operations such as updating the screen, which can further reduce the power consumption of the power supply and extend the service life of the power supply. In addition, even when used in scenes such as supermarket shelves, the electronic tag generally only needs to update the display screen one to five times per day. With the structure of the above-mentioned electronic tag, the service life of the power supply can be greatly extended.

As an optional embodiment, the switch circuit 14 is configured to connect the power supply module 11 to the electronic tag circuit 13 in response to receiving the update instruction.

It can be seen that the low-power electronic tag according to this embodiment is configured to enable the electronic tag circuit to operate by connecting the power supply module 11 to the electronic tag circuit 13 only when the display screen needs to be updated, and to disconnect the power supply module 11 from the electronic tag circuit 13 in the rest of the time so that the power supply module 11 does not supply power, so that the detection power consumption occurs only when the display screen needs to be updated, and the detection power consumption does not occur when the display screen does not need to be updated, thereby greatly reducing the overall power consumption of the electronic tag.

As an optional embodiment, the electronic tag circuit 13 is configured to:

perform the detection action in response to receiving the update instruction (i.e., when the display screen needs to be updated); herein, optionally, when the display screen needs to be updated, the electronic tag circuit 13 automatically performs the detection action after the power supply module 11 is connected to the electronic tag circuit 13 by the switch circuit 14; and receive updating date which is sent from a server to the electronic tag circuit 13 after performing the detection action for a predetermined time interval (for example, 30 s), and update the display screen according to the updating date.

In this way, when the display screen needs to be updated, the control system sends the update instruction to the electronic tag. In response to receiving the update instruction, for example, the controller controls the switch circuit 14 to connect the power supply module 11 to the electronic tag circuit 13, and then the electronic tag circuit 13 automatically performs the detection action, thereby achieving synchronization of connecting the power supply module 11 to the electronic tag circuit 13 and automatically updating.

Optionally, the switch circuit 14 is configured to disconnect the power supply module 11 from the electronic tag circuit 13 after the update of the display screen is completed. In this way, the power supply is disconnected after the update is completed, so that the electronic tag circuit is in a zero loss state due to the disconnection from the power supply in the rest of the time period except the update period, thereby further reducing power consumption.

In some embodiments, the switch circuit 14 includes a tunneling magnetoresistance (TMR) sensor, which is configured to be turned on or off in response to a change in an external magnetic field. Herein, the TMR sensor refers to a sensor which is manufactured to have a TMR effect. The change in the external magnetic field is caused by a movement of a magnet installed in an external device relative to the electronic tag.

The TMR effect refers to an effect that in a ferromagnetic-insulator film (about 1 nanometer)-ferromagnetic material, a magnitude of the tunneling resistance changes with a relative direction of the ferromagnetic materials on both sides. From a point of view of classical physics, a sandwich structure of ferromagnetic layer+insulating layer+ferromagnetic layer cannot achieve punch-through of electrons in the ferromagnetic layers, but quantum mechanics can perfectly explain this phenomenon. When magnetization directions of the two ferromagnetic layers are parallel to each other, electrons of a majority-spin subband will enter empty states of the majority-spin subband in the other magnetic layer, and the electrons of a minority-spin subband will also enter the empty states of the minority-spin subband in the other ferromagnetic layer, thus a total tunneling current is large, and a device is in a low-resistance state. When the magnetization directions of the two ferromagnetic layers are anti-parallel, the case is just the opposite of the above situation, that is, the electrons of the majority-spin subband will enter empty states of the minority-spin subband in the other ferromagnetic layer, and the electrons of the minority-spin subband will also enter the empty states of the majority-spin subband in the other magnetic layer, thus the total tunneling current is small, and the device is in a high-resistance state. It can be seen that the tunneling current and the tunneling resistance depend on a relative orientation of magnetization intensities of the two ferromagnetic layers. When the magnetization direction changes, the tunneling resistance changes, and it is called the TMR effect. The TMR sensor uses a principle that a change in magnetoresistance is caused by a change in magnetic field, so the change in the external magnetic field can be calculated by the change in the magnetoresistance of the TMR sensor.

Figure 2:
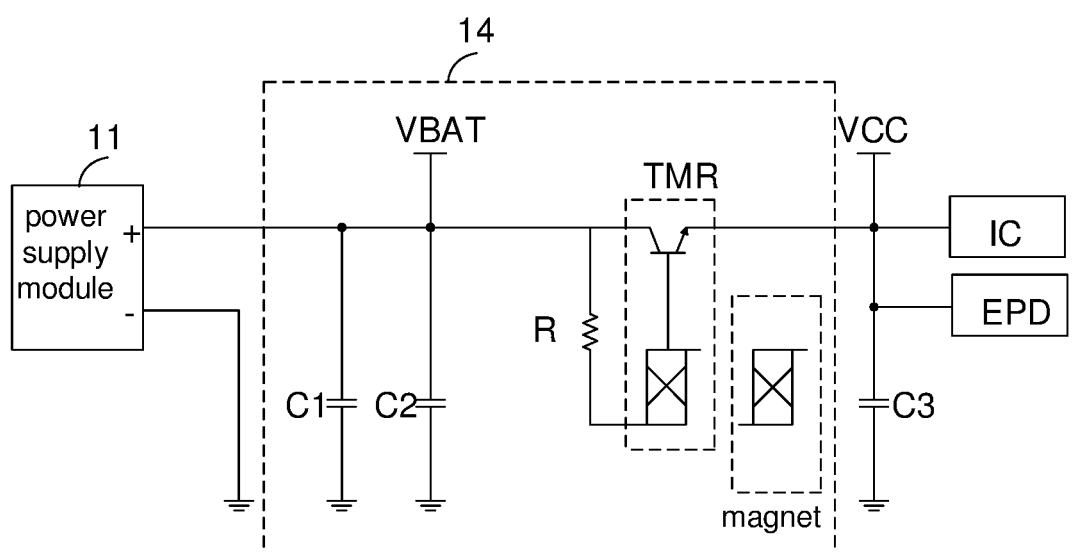
FIG. 2 is a schematic diagram of a circuit structure of an embodiment of an electronic tag according to an embodiment of the present disclosure.

Referring to FIG. 2, an equivalent circuit structure of the TMR sensor is a transistor (or triode) and a magnetoresistor connected in series with the gate of the transistor (or the base of the triode). In the absence of the external magnetic field, the magnetoresistor is in the high-resistance state, there is no voltage signal at the gate of the transistor (or the base of the triode), thus the transistor (or triode) is not turned on, and the electronic tag circuit is in the disconnected state, thereby achieving the zero loss. When there is the external magnetic field, the magnetoresistance of the magnetoresistor decreases, there is a voltage signal at the gate of the transistor (or the base of the triode), thus the transistor (or triode) is turned on, and the electronic tag circuit is in the connected state, thereby the electronic tag circuit enters the standby or operating state.

It can be seen that the TMR sensor is used as a component for realizing connecting and disconnecting of the electronic tag circuit, and since it is an ultra-low power sensor (the operating current is 1.5 µA during operation), the power consumed by it is negligible for the power supply, and basically does not affect the service life of the power supply.

As an embodiment, as shown in FIG. 2, the switch circuit 14 further includes a resistor R, a first capacitor C1, and a second capacitor C2. The resistor R is connected in parallel with the TMR sensor, and the first capacitor C1 and the second capacitor C2 are connected in parallel between a power supply voltage terminal VBAT of the power supply module 11 and a ground terminal.

Optionally, as shown in FIG. 2, a power supply voltage is transmitted to the electronic tag circuit 13 via the switch circuit 14 to form the supply voltage. The electronic tag circuit 13 may include a third capacitor C3 connected in parallel between a supply voltage terminal VCC and the ground terminal. The display module 12 may include the electronic paper EPD, and one end of the EPD is connected to the supply voltage terminal VCC. The electronic tag circuit 13 may further include a corresponding chip IC for forming a signal for operating the electronic tag, such as a driving signal, a control signal, etc.

It should be noted that the above circuit structure is only exemplary, and it can be known that, in addition to the above-mentioned circuit structure, other circuit structures can also be used to implement the electronic tag according to the present disclosure, and these alternative circuit structures should also fall within the scope of the present disclosure.

Optionally, the external device used to generate the external magnetic field for the TMR sensor may be a device installed with a magnet. When the magnet is moved closer to or farther away from the TMR sensor, a value of the internal magnetoresistance of the TMR sensor changes, so that the turning on or off of the TMR sensor can be controlled. Alternatively, the magnet can be integrated within a handheld control device. When a relevant staff holds the handheld control device and moves closer to or farther away from the electronic tag, the value of the internal magnetoresistance of the TMR sensor changes, so that the turning on or off of the TMR sensor can be controlled. For another example, on the shelf where the electronic tag is installed, a mechanical structure with a magnet is installed at an installation position of the electronic tag, and under a push of an external force, the magnet provided on the mechanical structure may move closer to or farther away from the electronic tag. As a result, the value of the internal magnetoresistance of the TMR sensor changes, so that the turning on or off of the TMR sensor can be controlled. The external device having the magnet installed therein moves the magnet in response to receiving the update instruction, thereby turning on the TMR sensor in the electronic tag. After the update of the display screen is completed, the electronic tag sends an update completion instruction to the external device, and the external device moves the magnet therein in response to receiving the update completion instruction, thereby disconnecting the power supply module from the electronic tag circuit. For example, the magnet may be mounted on a movable mechanical structure. The external device (or a controller installed in the external device) moves the movable mechanical structure in response to receiving the update instruction or the update completion instruction, thereby moving the magnet relative to the TMR sensor and changing the external magnetic field of an environment in which the TMR sensor is located.

It should be noted that the above arrangement manner of the magnet or the method for forming the magnetic field are only exemplary, and it can be known that, in addition to the above embodiment, other arrangement manners of the magnet or other methods for forming the magnetic field can be used to implement the present disclosure, and these alternative implementations should also fall within the scope of the present disclosure.

As an optional embodiment, the power supply in the power supply module 11 uses a button battery. When the electronic tag uses the button battery as the power supply, a single button battery in the electronic tag may be used for 5 years or more, which makes advantages of the electronic tag provided with the switch circuit more obvious.

The power consumption of the electronic tag per day according to the embodiment of the present disclosure is as follows: in the case that the update current of the electronic tag is 6~20 mA, each update time period is 15~30 s, and the number of updates per day is 2~4 times, the updating power consumption of the electronic tag per day is 0.125~1.67 mAh; in the case that the data transmission current of the electronic tag is 2~8 mA, each data transmission time period is 2~20 s, and the number of data transmissions per day is 2~4 times, the data transmission power consumption of the electronic tag per day is about 0.0056~0.44 mAh; in the case that the detection current of the electronic tag is generally 4~10 mA, each detection time period is 6~50 ms, and the detection is performed every 15 s, and the number of detections per day is 2~4 times, the detection power consumption of the electronic tag per day is approximately $1.67*10\textasciicircum(-5)\sim3.33*10\textasciicircum(-5)$ mAh.

Under the same usage environment, the power consumption of the existing electronic tag is compared with the power consumption of the electronic tag according to the embodiments of the present disclosure. In the case that the standby current is 2.5 μA, the detection current is 5 mA and the detection is performed every 15 s, the data transmission current is 3 mA and the data transmission time period is 10 s, the update current is 10 mA, the update time period is 15 s, and the number of updates per day is 3 times, comparison of the information of the power consumption is shown in the following table.

TABLE 2

Comparison of power consumption of the existing electronic tag and the electronic tag according to the embodiments of the present disclosure

| Project | Existing electronic tag | Electronic tag according to embodiments of the present disclosure |
| --- | --- | --- |
| Standby current | 2.5 μA | 0 |
| Standby time period per day | 24 h | 0 |
| Detection current | 5 mA | 5 mA |
| Detection time period every time | 20 ms | 20 ms |
| Number of detections per day | 5760 | 3 |
| Data transmission current | 3 mA | 3 mA |
| Data transmission time period every time | 4 s | 4 s |
| Number of data transmissions per day | 3 | 3 |
| Update current | 10 mA | 10 mA |
| Update time period every time | 15 s | 15 s |
| Number of updates per day | 3 | 3 |
| Power consumption per day | 0.355 mAh | 0.135 mAh |

By comparing the above information of the power consumption, it can be seen that the power consumption of the electronic tag according to the embodiments of the present disclosure is at least half lower than that of the existing electronic tag, and when the TMR sensor is turned on, an electrodynamic potential is generated by an electromagnetic induction and be converted into electrical energy. Therefore, a single button battery CR2450 can satisfy the use of the ultra-low power electronic tag for more than 5 years.

Figure 3:
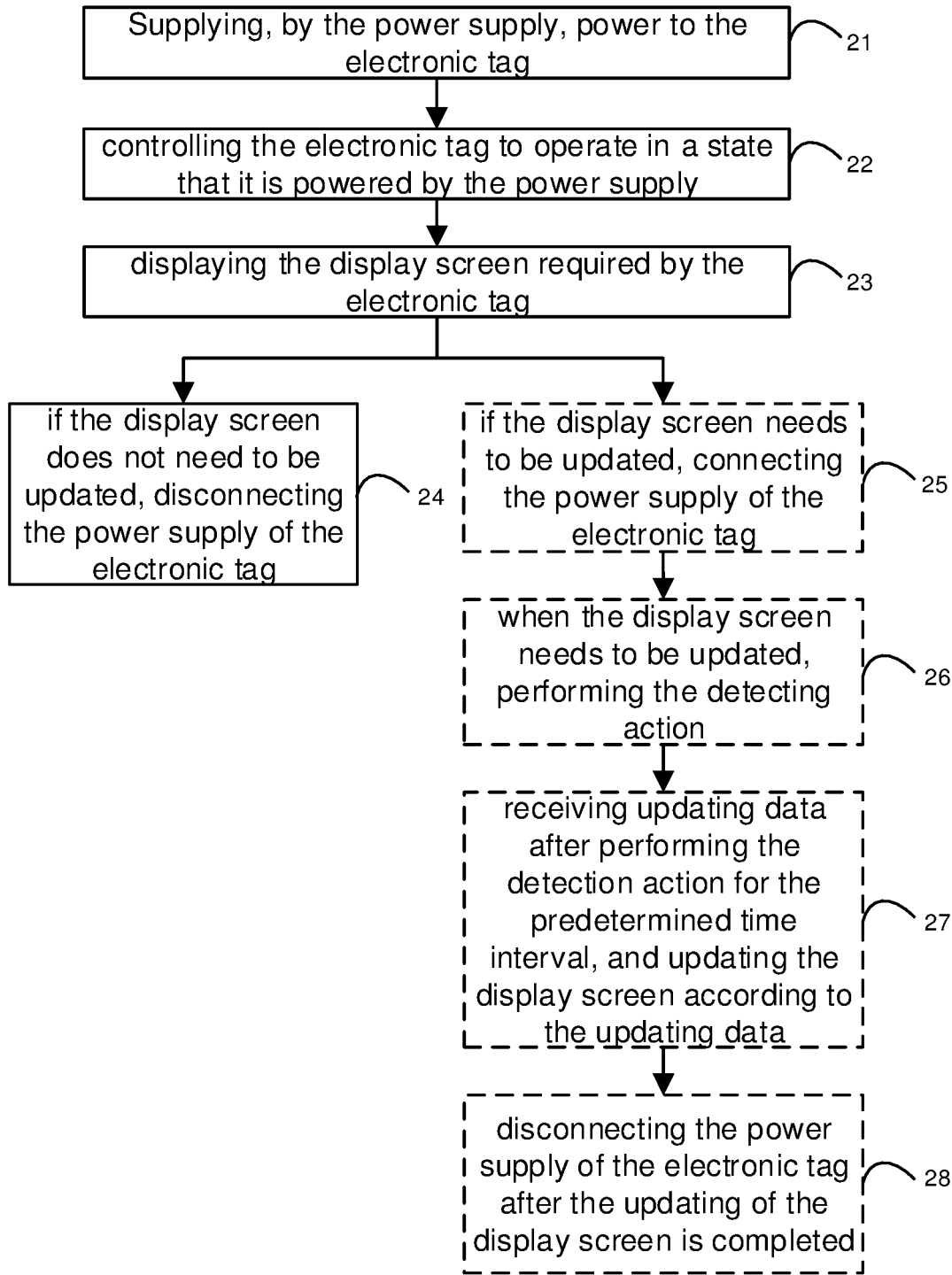
FIG. 3 is a schematic flowchart of an embodiment of a control method of the electronic tag according to an embodiment of the present disclosure.

FIG. 3 illustrates a schematic flowchart of an embodiment of a control method of an electronic tag according to an embodiment of the present disclosure.

As shown in FIG. 3, the control method of the electronic tag includes:

Step 21: supplying, by the power supply, power to the electronic tag;

Step 22: controlling the electronic tag to operate in a state that it is powered by the power supply;

Step 23: using the principle of reflection to display the display screen required by the electronic tag; and Step 24: in response to not receiving the update instruction, disconnecting the power supply of the electronic tag.

As can be seen from the above embodiment, the control method of the electronic tag according to the embodiment of the present disclosure includes disconnecting the power supply of the electronic tag when the display screen does not need to be updated, so that the standby power consumption and the detection power consumption do not occur when the display screen does not need to be updated, thereby reducing power consumption of the power supply and extending the service life of the power supply, that is, the electronic tag can achieve low power consumption.

As an optional embodiment, as shown in FIG. 3, the control method of the electronic tag further includes:

Step 25: In response to receiving the update instruction, that is, in the case that the display screen needs to be updated, connecting the power supply of the electronic tag.

It can be seen that the control method of the electronic tag according to this embodiment includes enabling the electronic tag to operate by connecting the power supply of the electronic tag only when the display screen needs to be updated, and disconnecting the power supply of the electronic tag in the rest of the time so that the power supply does not supply power, so that the detection power consumption occurs only when the display screen needs to be updated, and the detection power consumption does not occur when the display screen does not need to be updated, thereby greatly reducing the overall power consumption of the electronic tag.

As an optional embodiment, as shown in FIG. 3, the control method of the electronic tag further includes:

Step 26: performing the detecting action in response to receiving the update instruction;

Step 27: receiving updating data after performing the detection action for the predetermined time interval, and updating the display screen according to the updating data.

Optionally, as shown in FIG. 3, the control method of the electronic tag further includes:

Step 28: disconnecting the power supply of the electronic tag after the updating of the display screen is completed.

In this way, the power supply is disconnected after the update is completed, so that the electronic tag circuit is in the zero loss state due to the disconnection from the power supply in the rest of the time period except the update period, thereby further reducing power consumption.

As described in conjunction with FIG. 2, the electronic tag according to an embodiment of the present disclosure includes the TMR sensor connected between the power supply and the electronic tag circuit of the electronic tag.

Step 24 or step 28 of disconnecting the power supply of the electronic tag includes changing the external magnetic field so that the TMR sensor is disconnected in response to the change in the external magnetic field, thereby disconnecting the power supply of the electronic tag.

Correspondingly, step 25 of connecting the power supply of the electronic tag includes: changing the external magnetic field, so that the TMR sensor is turned on in response to the change in the external magnetic field, thereby connecting the power supply of the electronic tag.

The change in the external magnetic field is generated by the movement of the magnet installed in the external device relative to the electronic tag, and the external device moves the magnet in response to receiving the update instruction, thereby connecting the power supply of the electronic tag.

As an example, after the update of the display screen is completed, the electronic tag sends an update completion instruction to the external device, and the external device moves the magnet therein in response to receiving the update completion instruction, thereby disconnecting the power supply module from the electronic tag circuit.

Those skilled in the art should understand that the above descriptions are only specific embodiments of the present disclosure and are not intended to limit the present disclosure. Any modification, equivalent replacement, or improvement made within the spirit and principle of the present disclosure etc., should be included in the scope of the present disclosure.

We claim:

1. An electronic tag, comprising:
a power supply module configured to supply power to the electronic tag;
a display module comprising a reflective display unit and configured to display a display screen required by the electronic tag;
an electronic tag circuit configured to control the electronic tag to operate in a state that the electronic tag is powered by the power supply module; and
a switch circuit connected between the power supply module and the electronic tag circuit, and configured to disconnect the power supply module from the electronic tag circuit in response to not receiving an update instruction and connect the power supply module to the electronic tag circuit in response to receiving the update instruction,
wherein the switch circuit comprises:
a tunneling magnetoresistance (TMR) sensor, which is configured to be turned on or off in response to a change in an external magnetic field;
a resistance connected in parallel with the TMR sensor; and
a first capacitor and a second capacitor, the first capacitor and the second capicitor are connected in parallel between a power supply voltage terminal of the power supply module and a ground terminal.

2. The electronic tag of claim 1, wherein the change in the external magnetic field is generated by a movement of a magnet installed in an external device relative to the electronic tag, and the external device moves the magnet therein in response to receiving the update instruction.

3. The electronic tag of claim 1, wherein the electronic tag circuit is further configured to:
perform a detecting action in response to receiving the update instruction; and
receive updating data after performing the detection action for a predetermined time interval, and update the display screen according to the updating data.

4. The electronic tag of claim 3, wherein the switch circuit is further configured to disconnect the power supply module from the electronic tag circuit after the updating of the display screen is completed.

5. The electronic tag of claim 4, wherein after the updating of the display screen is completed, the electronic tag sends an update completion instruction to the external device, and the external device moves the magnet therein in response to receiving the update completion instruction, thereby disconnecting the power supply module from the electronic tag circuit.

6. The electronic tag of claim 1, wherein the power supply module comprises a button battery.

7. The electronic tag of claim 1, wherein the display module comprises an electronic paper.

8. A control method of the electronic tag of claim 1, comprising:
supplying, by a power supply, power to the electronic tag;
controlling the electronic tag to operate in a state that the electronic tag is powered by the power supply;
displaying a display screen required by the electronic tag; and
in response to not receiving an update instruction, disconnecting the power supply of the electronic tag.

9. The control method of claim 8, further comprising:
in response to receiving an update instruction, connecting the power supply of the electronic tag.

10. The control method of claim 9, further comprising:
performing a detecting action in response to receiving the update instruction; and
receiving updating data after performing the detection action for a predetermined time interval, and updating the display screen according to the updating data.

11. The control method of claim 10, further comprising:
disconnecting the power supply of the electronic tag after the updating of the display screen update is completed.

12. The control method of claim 10, wherein the electronic tag comprises a tunneling magnetoresistance (TMR) sensor connected between the power supply and an electronic tag circuit of the electronic tag, and wherein the disconnecting the power supply of the electronic tag comprises:
changing an external magnetic field so that the TMR sensor is turned off in response to a change in the external magnetic field; and
wherein the change in the external magnetic field is generated by a movement of a magnet installed in an external device relative to the electronic tag, and the external device moves the magnet therein in response to receiving the update instruction.

13. The control method of claim 11, further comprising:
sending, by the electronic tag, an update completion instruction to the external device, the external device moving the magnet therein in response to receiving the update completion instruction, thereby disconnecting the power supply of the electronic tag.

* * * * *